(12) United States Patent
Giefer et al.

(10) Patent No.: US 8,413,534 B2
(45) Date of Patent: Apr. 9, 2013

(54) SHIFTING DEVICE FOR A VEHICLE TRANSMISSION

(75) Inventors: Andreas Giefer, Lemfoerde (DE); Jörg Meyer, Wagenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/813,697

(22) PCT Filed: Jan. 11, 2006

(86) PCT No.: PCT/DE2006/000029
§ 371 (c)(1),
(2), (4) Date: Oct. 1, 2008

(87) PCT Pub. No.: WO2006/074644
PCT Pub. Date: Jul. 20, 2006

(65) Prior Publication Data
US 2010/0212447 A1  Aug. 26, 2010

(30) Foreign Application Priority Data

Jan. 12, 2005  (DE) .......................... 10 2005 001 589

(51) Int. Cl.
*B60K 20/02* (2006.01)
*G05G 5/06* (2006.01)
(52) U.S. Cl. .................................. 74/473.23; 74/473.21
(58) Field of Classification Search ... 74/473.21–473.27
See application file for complete search history.

(56) References Cited

U.S. PATENT DOCUMENTS

| 2,890,581 | A | * | 6/1959 | Lewis ............................. 70/248 |
| 4,905,802 | A | * | 3/1990 | Gotoh ............................. 70/245 |
| 4,966,262 | A | * | 10/1990 | Mieczkowski ............. 192/220.2 |
| 5,018,610 | A | * | 5/1991 | Rolinski et al. ................. 477/96 |
| 5,775,166 | A | | 7/1998 | Osborn et al. |
| 5,842,384 | A | * | 12/1998 | Berger ........................... 74/529 |
| 6,209,408 | B1 | * | 4/2001 | DeJonge et al. ............... 74/335 |
| 6,431,339 | B1 | | 8/2002 | Beattie et al. |
| 2002/0077217 | A1 | | 6/2002 | Presley |
| 2004/0226801 | A1 | | 11/2004 | De Jonge et al. |

FOREIGN PATENT DOCUMENTS

| DE | 199 13 005 A1 | 10/2000 |
| DE | 101 36 426 A1 | 2/2003 |
| DE | 101 46 775 B4 | 4/2003 |
| DE | 102 52 009 B4 | 5/2004 |

* cited by examiner

*Primary Examiner* — William C Joyce
*Assistant Examiner* — Terence Boes
(74) *Attorney, Agent, or Firm* — McGlew and Tuttle, P.C.

(57) ABSTRACT

A shifting device is provided for a vehicle transmission with a selector lever pivotable within a shifting device housing about at least one axis of rotation for selecting gears defined within the vehicle transmission. A shift position of the selector lever is assigned to at least one gear. A locking device for the individual shift positions of the selector lever can be released as a function of given general data of the state of motor vehicle components such as the pedal mechanism and the engine. The locking device has a locking element displaceable by the selector lever analogously to the individual shift positions of the selector lever. The locking element has a plurality of locking devices, which correspond to the individual shift positions and which can be brought into a locking position and an unlocking position by at least one actuating device.

3 Claims, 3 Drawing Sheets

SHIFTING DEVICE FOR A VEHICLE TRANSMISSION

CROSS REFERENCE TO RELATED APPLICATIONS

This application is a United States National Phase application of International Application PCT/DE2006/000029 and claims the benefit of priority under 35 U.S.C. §119 of German Patent Application DE 10 2005 001 589.1 filed Jan. 12, 2005, the entire contents of which are incorporated herein by reference.

FIELD OF THE INVENTION

The present invention pertains to a shifting device for a vehicle transmission of a motor vehicle with a selector lever pivotable within a shifting device housing about at least one axis of rotation for selecting gears defined within the automatic transmission, wherein a shift position of the selector lever is assigned to each gear, and with a locking device that can be unlocked as a function of preset general data of the state of motor vehicle components such as pedal mechanism and engine.

BACKGROUND OF THE INVENTION

Such shifting devices may be provided with locking devices, which make it possible to change or lock the selector lever position as a function of preset parameters, such as the engine speed, the velocity of the vehicle, the position of the pedal mechanism as well as other conceivable parameters of the vehicle, and are known in various embodiments in the state of the art. The locking devices may be designed as so-called shift locks, which are integrated in the hydraulic control circuit of the automatic transmission corresponding to an exemplary embodiment variant and act such that an electrical control signal dependent on the above-mentioned parameters affects a switching valve, which optionally ignores a change in gear intended by the driver and initiated by the driver via the selector lever until a change in gear will be possible without problems as a consequence of suitable general conditions.

An essential drawback of this is the fact that the shift lock becomes active within the automatic transmission, i.e., the driver is able to bring the selector lever into a position even when the execution of the command thus preset is inadmissible per se and is thus also prevented by the shift lock. As a consequence of the delayed change in gear, driving safety may be impaired in extreme cases when such shift locks are used if the gear shifted finally with a delay is no longer proper for the overall driving situation of the vehicle.

Moreover, there are shifting devices that contain various designs of locking devices, which prevent the undesired or unauthorized selection of a gear or the starting of the engine with a gear engaged by means of mechanical locking elements in the shifting device housing.

Especially the systems known as "keylock" and "shiftlock" may be mentioned here from the state of the art.

In the "keylock" system, the engine can be started only if the selector lever is in the park position "P." Likewise, when parking the vehicle, the ignition key can be removed in the park position "P" only, so that engagement of the parking brake is compulsory and it is impossible to accidentally remove the ignition key during driving.

In the "shiftlock" system, incorrect shiftings, which may lead to damage to the connected automatic transmission as a consequence of incorrect general conditions for the desired gear selection range, such as excessively high engine speeds or incorrect velocities, are avoided by locking the selector lever. An example of such general conditions is, for example, the specification that the reverse position "R" can only be selected if the velocity of the motor vehicle is lower than 5 km/hour.

For embodying "shiftlock" or "keylock" systems, locking devices are known, e.g., from DE 199 13 005 A1, in which there is a locking element displaceable by the selector lever in a plane in which a meshing contour assigned to the particular gearshift lever position of the selector lever is present, which said contour meshes with a component belonging to the selector lever. The installation of such locking systems is inevitably associated with major interventions with the structure of the shifting device in question, because the contours of the locking element necessary for locking the gear selection range of the selector lever must be adapted to the selector lever geometry.

SUMMARY OF THE INVENTION

The object of the present invention is therefore to improve such constructions, on the basis of the shifting devices of this type known from the state of the art, such that the corresponding locking devices can also be introduced as independent, separate assembly units without problems into already existing shifting device constructions by minor modifications. Moreover, the shifting device according to the present invention shall be able to be manufactured at low cost and meet all necessary requirements on service life and reliability.

This object is accomplished according to the present invention by the mobile locking element of the locking device having a plurality of locking devices, which correspond to the individual shift positions and which can be brought into a locking position and an unlocking position by an actuating means.

The design embodiment dissociates the locking task and the unlocking task of the selector lever from the direct connection to the selector lever and creates an independent assembly unit, which can be used and retrofitted for different variants of shifting devices. The only connection to the selector lever is a necessary binding of the displaceable locking element, because this element is moved by the motion of the selector lever in a forced manner. The locking and unlocking tasks are separated from the rest of the shifting device by the locking devices, for which various embodiments are conceivable.

For example, it is possible to design the locking devices as a combination of a bolt movable by the actuating device and a plurality of recesses in the locking element which correspond to a gear selection position to be locked, the bolt passing through one of the recesses of the locking element in the locked state.

The motion of the bolt may also be brought about by an actuating means, which has a hydraulic, electromagnetic, pneumatic or electric drive and ensures the adjusting motion by means of corresponding controls.

As an alternative to this, a design embodiment is also possible, corresponding to another advantageous embodiment variant, in which the locking devices has a cam, which projects over the surface of the locking element and over which extends a mobile bolt with a recess arranged therein for receiving the cam.

This embodiment variant represents another active surface pair of the locking device, which may possibly be advantageous under given general conditions.

An exemplary embodiment of the subject of the present invention will be explained in more detail below on the basis of the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
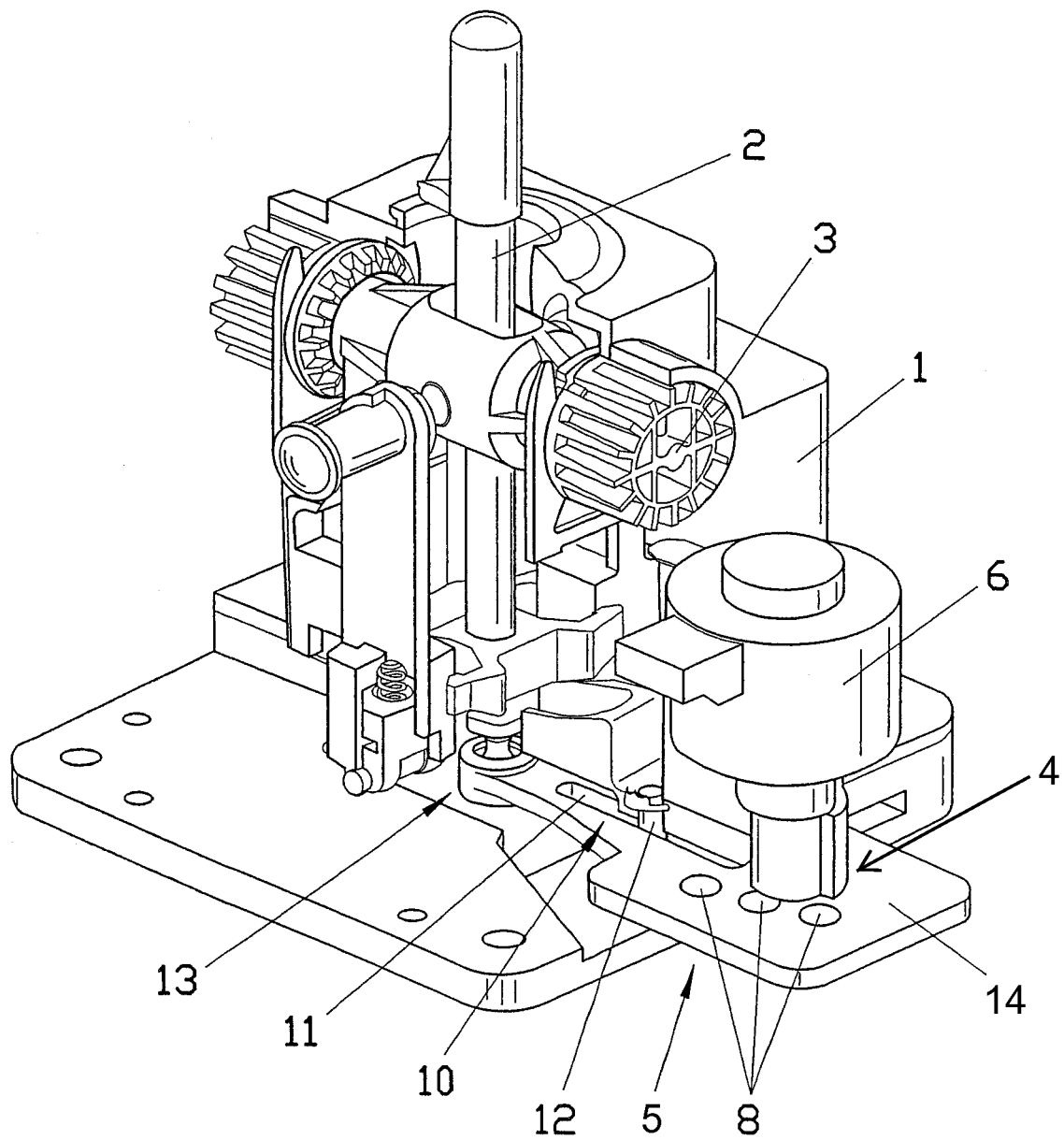
FIG. 1 is a perspective view of a shifting device according to the present invention in the unlocked state of the selector lever.

Referring to the drawings in particular, the shifting device shown in the figures has a selector lever 2, which is pivotable in a shifting device housing 1 about an axis 3. At the other, free end of the selector lever 2, the selector lever is connected to a locking element 5 of a locking means or locking device 4. The locking device 4 is used to lock the motion of the selector lever in certain positions, which correspond to corresponding gears of a transmission. Locking is necessary whenever a change in the position of the selector lever is incompatible with other general data of the state of motor vehicle components, such as a pedal mechanism, and a change in the position of the selector lever and hence a change in gear selection would lead to damage to the downstream transmission or to an undesired motion of the vehicle.

Since the selector lever 2 is connected to the locking element 5, which has a displaceable holding plate 14 in this exemplary embodiment, via a ball head-cylinder combination 13, adjustment of the selector lever 2 inevitably leads to a corresponding motion of the locking element 5. A link guide 10 is provided. The link guide 10 comprises a substantially rectilinear groove 11 and a fixed pin 12 disposed in the groove 11. For each position of the selector lever 2 or for each gear position of the transmission, the locking element 5 has a locking features or locking devices 7, by which the locking element 5 can be fixed in the corresponding selector lever position.

Figure 2:
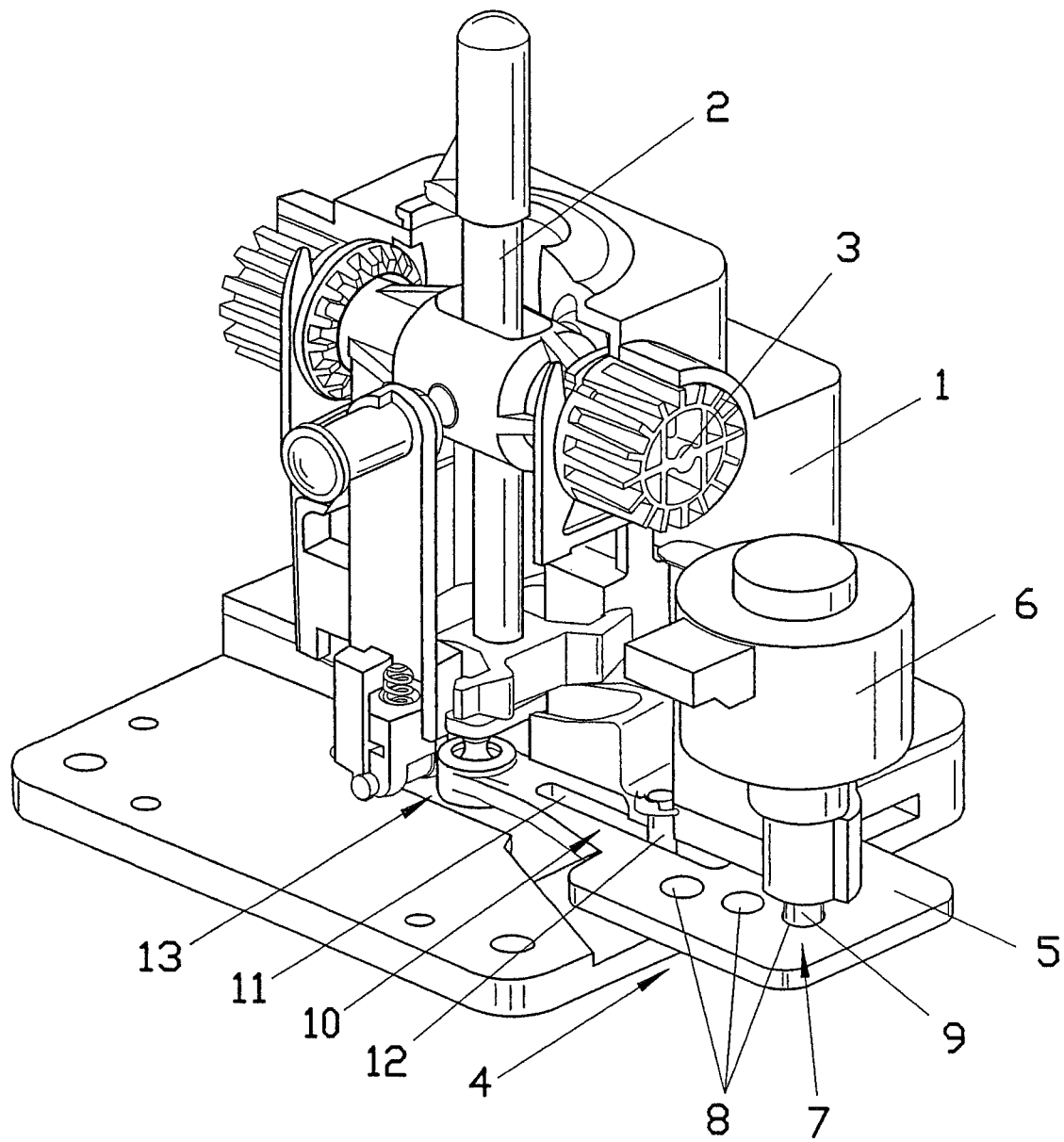
FIG. 2 is a perspective view of the shifting device from FIG. 1 in the locked state of the selector lever.
Figure 3:
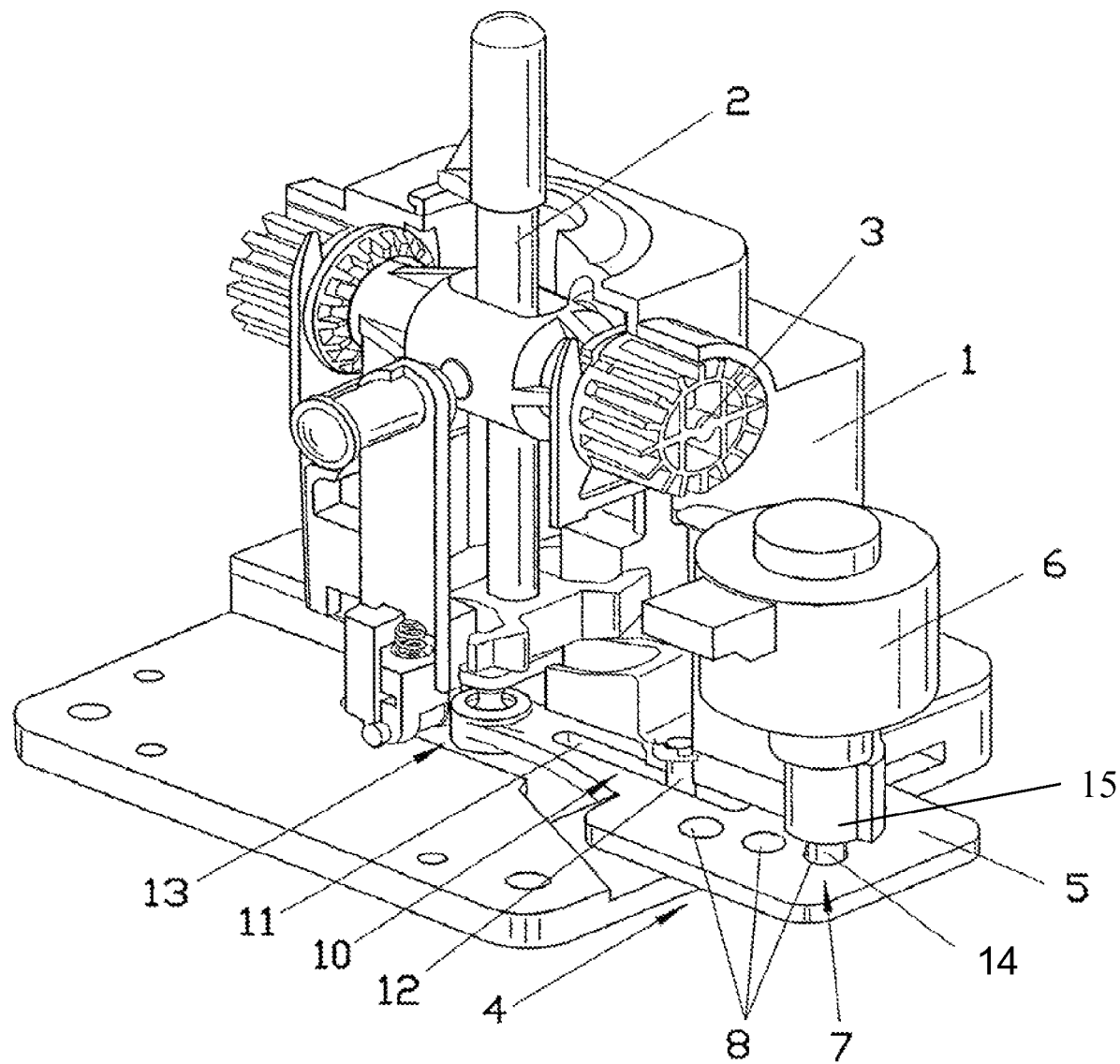
FIG. 3 is a perspective view of another embodiment of the shift device in the locked state of the selector lever.

The locking devices 7 comprise, corresponding to the exemplary embodiment shown in FIGS. 1 and 2, a plurality of recesses 8, which are prepared in the locking element 5 and which are preferably of a circular shape. An actuating means 6, which may be provided with a hydraulic, electric, electromagnetic or pneumatic drive, is located above the locking element 5. The drive is used to move a bolt 9 as an actuated part belonging to the locking devices 7 out of the actuating means 6 and to introduce it into one of the recesses 8 depending on the position of the locking element 5. If the bolt 9 has been introduced into a recess 8, the locking element 5 is locked in the corresponding position and, as a result of this, the selector lever 2 is also locked in the corresponding position. Two possibilities are conceivable, in principle, for the actuation of the actuating means 6 and the switching of the drive. In another embodiment as shown in FIG. 3, the holding plate may include one or more cams 14 that project over the surface of the locking element (holding plate) 5 and which can be received by a bolt 15 with a recess arranged therein.

These two possibilities will be explained below as an example on the basis of an electromagnetic drive design. One of the drive designs may be designed such that the bolt is removed from the actuating device when the drive is energized. If the drive becomes currentless, the bolt is pulled out of one of the recesses 8 as a consequence of a suitable restoring spring present within the actuating device, so that the locking element 5 and the selector lever connected thereto can be moved. The other embodiment variant provides for introducing the bolt 9 into the actuating means when the drive is energized and for removing it in the currentless state. This variant would have the consequence that the selector lever would be automatically locked, e.g., when the ignition is turned off.

Both the above-described "keylock" and "shiftlock" systems and another type of locking of the selector lever as a function of driving and operating states of the vehicle in question can be embodied by means of the shifting device described in a simple and inexpensive manner. The state of the brake (brake pedal depressed or not depressed), the state of the ignition lock (ignition lock locked or ignition lock released) as well as the speed on the engine or the transmission can be sensed for this by means of suitable sensors. The data flow to a central control unit (CPU), which performs the locking or release of the selector lever with the signals determined by means of the actuating means 6 with the use of the locking device 7.

While specific embodiments of the invention have been shown and described in detail to illustrate the application of the principles of the invention, it will be understood that the invention may be embodied otherwise without departing from such principles.

The invention claimed is:

1. A shifting device for a vehicle automatic transmission, the shifting device comprising:
    a shifting device housing;
    a selector lever pivotable within said shifting device housing about at least one axis of rotation for selecting gears, wherein a shift position of the selector lever is assigned to each gear;
    a ball head mounted to an end portion of said selector lever
    a holding plate comprising a substantially rectilinear groove and a fixed pin disposed in said substantially rectilinear groove, said fixed pin being fixed to said shifting device housing;
    a locking means for locking and unlocking the individual shift positions of the selector lever, as a function of preset data of a state of a motor vehicle, said locking means comprising a locking element including said holding plate displaceable, relative to said fixed pin, by the selector lever upon movement of said selector lever to individual shift positions of the selector lever and having a plurality of recesses, which respectively correspond to the individual shift positions and an actuating means for bringing an actuated part into a locking position and into an unlocking position of at least one of said recesses, said locking element being directly connected to said selector lever via said ball head.

2. A shifting device for an automatic transmission in accordance with claim 1, wherein said selector lever comprises a selector lever end portion, said ball head being connected to said selector lever end portion, at least a portion of said locking element being adjacent to said selector lever end portion, said ball head engaging said holding plate.

3. A shifting device for an automatic transmission in accordance with claim 1, wherein said locking means comprises a bolt as said actuated part and said recesses in the holding plate, which said recesses corresponds to said shift positions, said holding plate comprising a plate portion, said plate portion comprising said recesses, said actuating means and said bolt being substantially perpendicular to said at least one axis of rotation, each of said recesses extending in a direction parallel to said bolt, said plate portion being substantially parallel to said at least one axis of rotation, one of said recesses receiving at least a portion of said bolt in said locking position, said bolt being located at a spaced location in said unlocking position.

\* \* \* \* \*